UNITED STATES PATENT OFFICE.

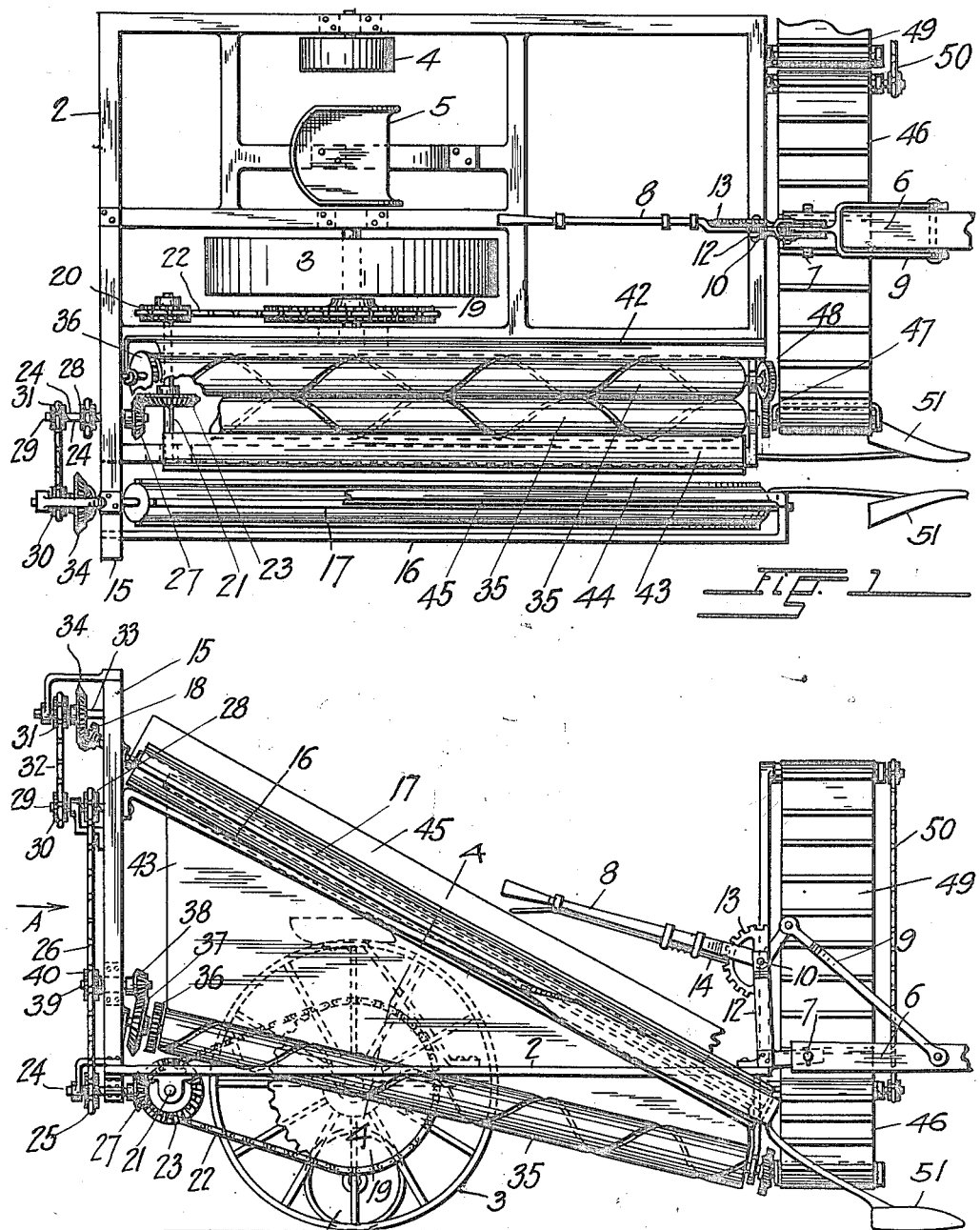

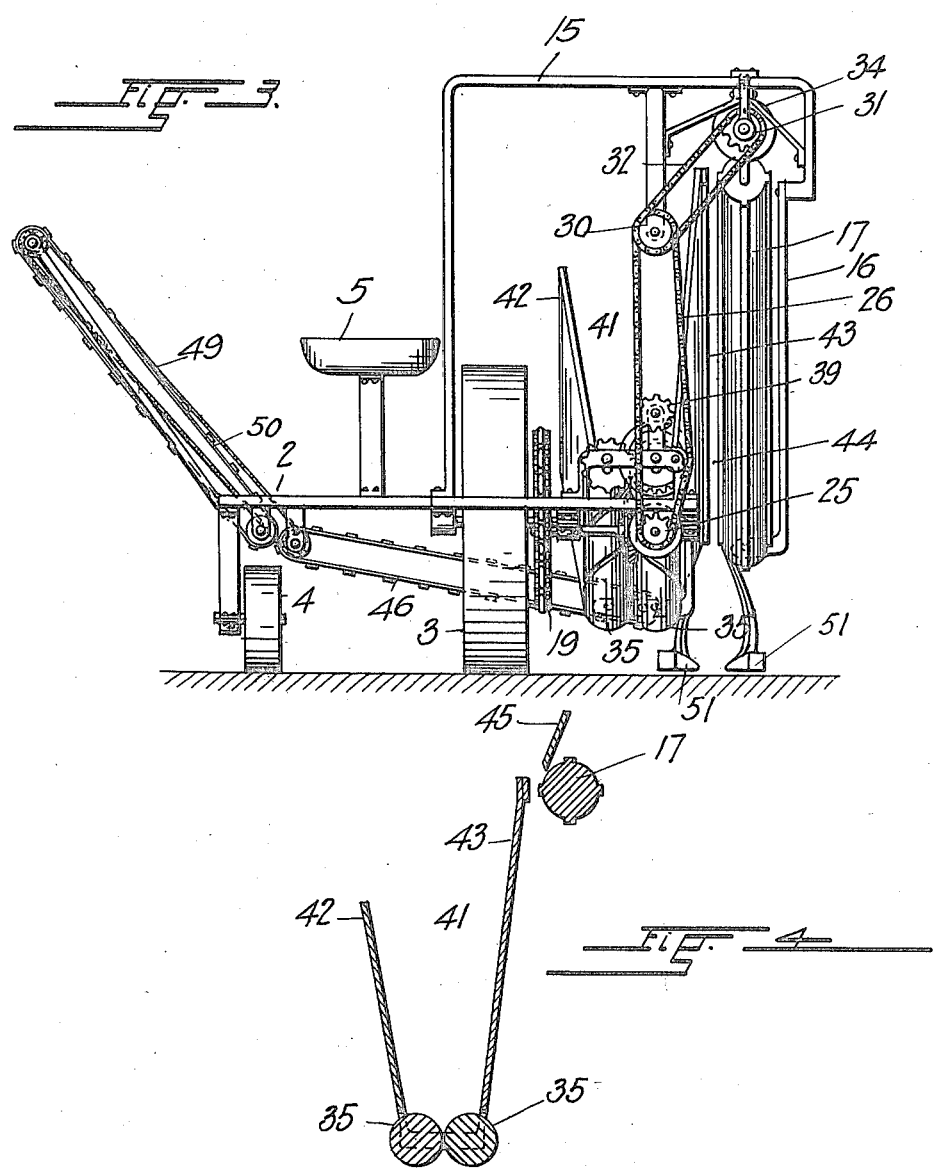

GEORGE B. LOCER, OF FORT LOGAN, COLORADO.

CORN-HUSKER.

1,253,611.  Specification of Letters Patent.  Patented Jan. 15, 1918.

Application filed March 29, 1917. Serial No. 158,442.

*To all whom it may concern:*

Be it known that I, GEORGE B. LOCER, a citizen of the United States, residing at Fort Logan, in the county of Arapahoe and State of Colorado, have invented certain new and useful Improvements in Corn-Huskers, of which the following is a specification.

My invention relates to corn husking machines and its primary object resides in providing a corn husker in which simplicity of construction is combined with effectuality in use.

Another object of my invention is to provide a machine of the character mentioned which will move in its entirety between the rows of standing corn in the field while stripping the ears off the stalks in one of them, in which respect the improved machine differs from most of the corn huskers at present on the market, which require that the team moving on opposite sides of a row of corn stalks to strip the ears either from the same row or from an adjoining one.

A structural embodiment of my invention is illustrated in the accompanying drawings in which—

Figure 1 is a plan view of my improved corn-husking machine,

Fig. 2, a side elevation of the same,

Fig. 3, a rear end elevation looking in the direction of the arrow A, Fig. 2, and Fig. 4, a transverse section taken along the line 4—4, Fig. 2 showing the relative arrangements of the rollers and shields included in the construction of the machine.

Referring more specifically to the drawings in the various views of which like parts have been designated by corresponding reference characters, 2 designates the frame of the machine which is constructed in skeleton form to support the elements of the invention which coöperate in harvesting the corn.

The frame is supported upon a traction wheel 3 and a caster wheel 4. The first mentioned wheel is mounted substantially intermediate of the sides of the frame and the caster wheel is disposed to support the latter at its side opposite to that at which the harvesting mechanism is assembled as will hereinafter be described.

The operator's seat 5 is fastened to the frame at a point between those at which it is supported upon the two wheels. A pole 6 for the attachment of draft-animals is pivoted at the front end of the frame as at 7 and a bell-crank lever 8 which is connected with the pole by a bifurcated link 9, is fulcrumed at 10, on a standard 12 erected at the front end of the frame.

The bell-crank serves to raise the front end of the frame by tilting it about the pivot 7, and a toothed segment 13 is provided to lock the bell-crank lever in its adjusted positions through the medium of a spring-pressed pawl 14.

Erected at the rear end of the frame is an upright structure 15 which overhangs its side at which the harvesting mechanism is assembled and which includes a forwardly slanting arm 16.

The superstructure is designed for the support of a single snapping roller 17 which in the operation of the machine strips the ears of corn from stalks passing between the roller and the adjacent side of the frame.

The snapping roller which is rotatably mounted in bearings at the front end of the arm 16 and adjacent the upper end of the overhanging portion of the superstructure, slants from the horizontal sufficiently to permit of its engaging the corn stalks along their entire lengths.

The roller has a plurality of longitudinal ribs which facilitate the stripping action and it carries at the end of its upper trunnion a gear-wheel 18 for its connection with the mechanism which transmits the rotary movement of the traction wheel 3 to the harvesting mechanism of which the roller 17 is a part.

The transmission mechanism comprises a sprocket-wheel 19 mounted on the shaft of the traction-wheel, a second sprocket-wheel 20 of smaller diameter which is mounted on a counter-shaft 21 and connected with the first-mentioned wheel by a chain 22, a pair of beveled gear wheels 23 and 27 which transmit the movement of the counter-shaft 21 to a second counter-shaft 24 supported at right angles thereto, a pair of sprocket wheels 25 and 28 which through the instrumentality of a chain 26 transmit the rotary movement of the second counter-shaft to a third countershaft 29, a pair of sprocket wheels 30 and 31 which by means of a chain 32 transmit the movement of the third counter shaft to a fourth countershaft 33 mounted at the top of the superstructure, and, finally, a beveled gear-wheel 34 which is mounted on the last-mentioned shaft in operative engagement with the gear-wheel 18 of the roller 17.

Mounted below and slightly to one side of the snapping roller are a pair of tangentially engaging husking rollers 35 which are supported for rotation about axes which slant from the horizontal at a smaller angle.

The husking rollers have peripheral helical grooves which aid in removing the husks from the ears of corn and they are connected for simultaneous rotation in opposite directions by a pair of gear-wheels 36 at their upper ends.

The rollers are in the operation of the machine rotated by two beveled gear-wheels 37 and 38 one of which is connected with one of the rollers and the other one of which is mounted on a shaft 39 which carries a sprocket-wheel 40 in engagement with a sprocket chain 26.

A chute 41 by which the ears of corn stripped from the stalks by the action of the snapping roller are conducted to the husking rollers, is composed of two cheek plates 42 and 43 which slant convergently at opposite sides of the pair of husking rollers.

The inner one of the two plates has its lower edge contiguous and parallel to the surface of the adjacent husking roller while its upper edge extends parallel and in spaced relation to the surface of the snapping roller.

The space 44 between the plate 43 and the last-mentioned roller, best shown in Fig. 4 of the drawings, provides a passage for the corn plants in a row along which the machine is drawn by draft-animals attached to its pole, and a shield 45 extends above and partially in front of the roller 17 to prevent the ears from being thrown outwardly and to direct them into the chute composed of the plates 42 and 43.

The corn ears discharged over the lower ends of the husking rollers fall onto an endless conveyer-belt 46 which is mounted on rollers underneath the frame 2 and which is operated by the movement of the adjacent husking roller, through the medium of a pair of beveled gear-wheels 47 and 48.

The conveyer connects at its outer end with an inclined elevator 49 likewise composed of an endless belt which deposits the ears into a suitable receptacle such as a wagon driven alongside the machine.

The elevator is operated by means of a chain 50 which engages sprocket wheels connected with the outer roller of the conveyer and the upper one of the two rollers over which the elevator has its movement.

A pair of forwardly converging shoes 51 mounted in spaced relation to each other forward of the harvesting elements and at opposite sides of the passage 44 between the snapping roller and the adjacent side of the chute 41, move in close proximity to the surface of the ground to guide the corn plants into said passage.

In the operation of the machine the corn stalks pass through the space between the snapping roller and the upper edge of the chute by the forward travel of the machine along a row of plants standing in the field. The rotating roller 17 in coöperation with the upper edge of the relatively stationary plate 43 snaps the ears of the corn from the stalks and delivers them into the chute through which they move onto the husking rollers, it being understood that the shield above the snapping roller aids in directing the corn-ears into the chute.

The husking rollers rotating in opposite directions toward each other remove the husks from the corn ears while the latter move toward the lower ends thereof. The husks pass between the rollers and fall onto the ground and the corn ears passing over the lower end of the slanting rollers, move onto the endless conveyer which delivers them onto the elevator.

It will be seen that inasmuch as all the harvesting elements are located at one side of the frame, the machine in operation may move in its entirety between rows of standing corn in a field and thereby prevent contact with the stalks other than those comprised in the row from which the ears are being collected.

The single snapping roller in conjunction with the upper edge of the plate which defines the space through which the corn stalks pass during the forward movement of the machine, provides an effective medium for stripping ears from the stalks, and the husking rollers coöperatively assembled as shown and described, complete the operation by quickly and completely removing the husks from the corn ears which are fed thereinto through the chute.

Having thus described my invention what I claim and desire to secure by Letters-Patent is:

1. A corn-husking machine comprising in combination, a wheeled carrier and a corn-harvesting mechanism mounted on said carrier beyond a side thereof and including a pair of parallel rotary husking-rollers slanting upwardly toward the rear of the carrier, a hopper for feeding ears of corn upon said rollers, composed of two convergent side-members one of which has its upper edge slanting rearwardly in a line divergent to the plane of the axes of the husking-rollers, a snapping-roller mounted outside the hopper in parallel spaced relation to said edge thereof to provide a narrow passage for corn stalks along which the carrier is propelled, said snapping roller having upon its peripheral surface longitudinally extending ridges which coöperate with said edge of the hopper to strip corn-ears from the stalks passing through said passage, means for directing corn-stalks into said passage, an elevator disposed to receive corn-ears discharged over the forward ends of the husking-rollers, and mechanism for the rotation of the rollers and the operation of the elevator by the movement of the carrier.

2. A corn-husking machine comprising in combination, a wheeled carrier and a corn-harvesting mechanism mounted on said carrier beyond a side thereof and including a pair of parallel rotary husking-rollers slanting upwardly toward the rear of the carrier, a hopper for feeding ears of corn upon said rollers, composed of two convergent side-members one of which has its upper edge slanting rearwardly in a line divergent to the plane of the axes of the husking-rollers, a snapping-roller mounted outside the hopper in parallel spaced relation to said edge thereof to provide a narrow passage for corn-stalks along which the carrier is propelled, said snapping roller having upon its peripheral surface longitudinally extending ridges which coöperate with said edge of the hopper to strip corn-ears from the stalks passing through said passage, means for directing corn-stalks into said passage, and mechanism for the rotation of the rollers by the movement of the carrier.

In testimony whereof I have affixed my signature in presence of two witnesses.

GEORGE B. LOCER.

Witnesses:
G. J. ROLLANDET,
L. RHOADES.